June 16, 1925.
C. T. RIPLEY
COMPOSITE PACKING MATERIAL
Filed June 19, 1922    2 Sheets-Sheet 1
1,542,098
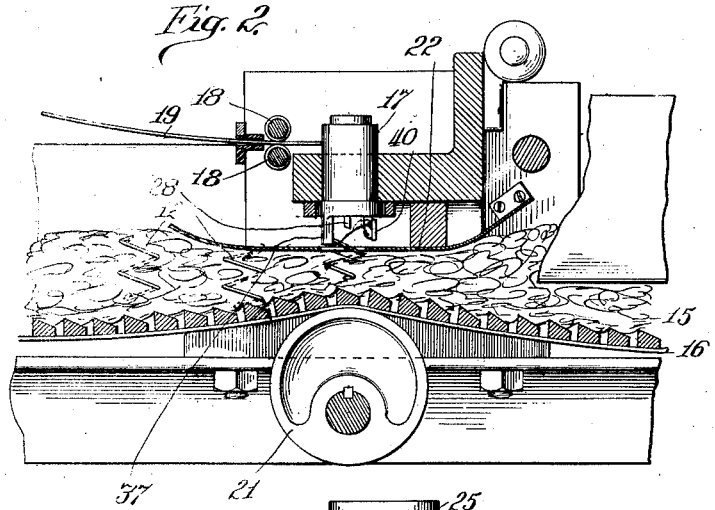
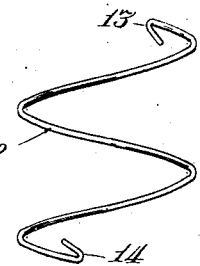
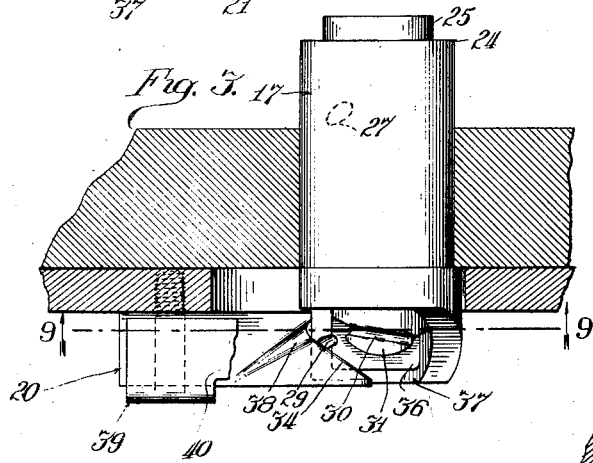
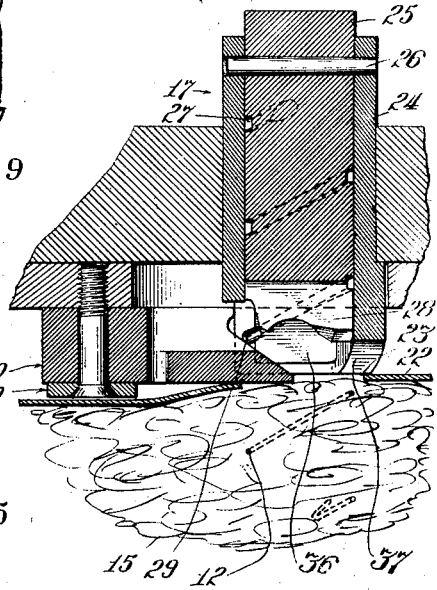
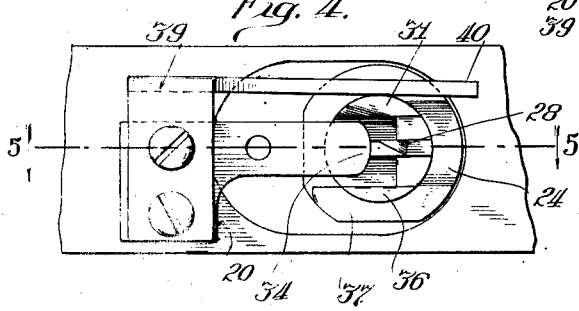

June 16, 1925.
C. T. RIPLEY
1,542,098
COMPOSITE PACKING MATERIAL
Filed June 19, 1922      2 Sheets-Sheet 2
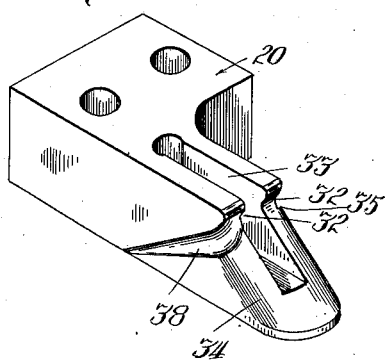
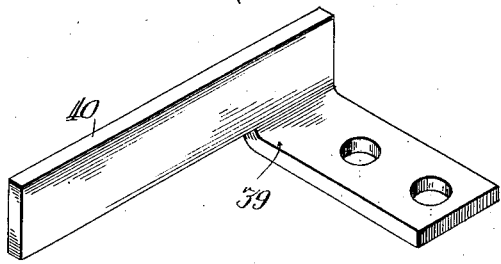
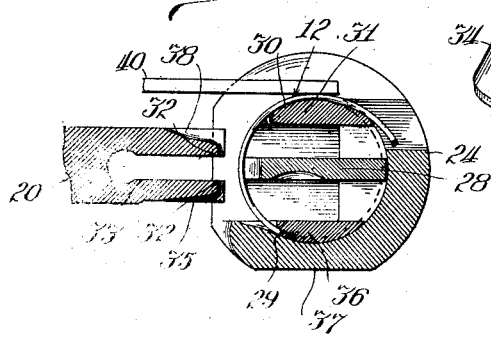
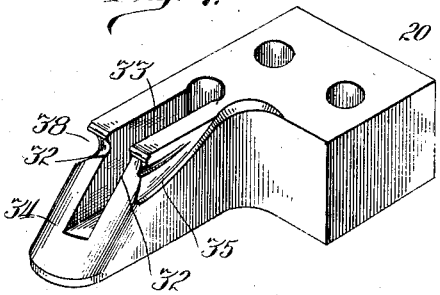
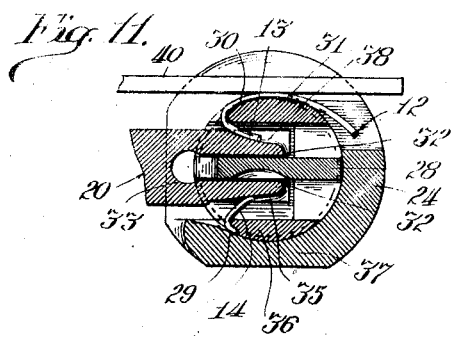
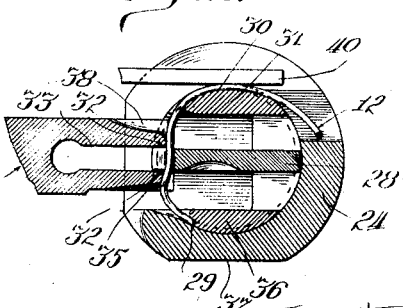

Patented June 16, 1925.

1,542,098

UNITED STATES PATENT OFFICE.

CHARLES T. RIPLEY, OF CHICAGO, ILLINOIS.

COMPOSITE PACKING MATERIAL.

Application filed June 19, 1922. Serial No. 569,433.

*To all whom it may concern:*

Be it known that I, CHARLES T. RIPLEY, a citizen of the United States, residing at Chicago, in the county of Cook and State of Illinois, have invented certain new and useful Improvements in Composite Packing Materials, of which the following is a specification.

My invention relates to a composite material for journal box packing or analogous purposes, of the general character described in my Patent No. 1,298,794, dated April 1, 1919, consisting of a body of absorbent, fibrous or capillary, or other loosely aggregated material, such, for example, as cotton or woolen waste, having embodied therein or interwoven therewith coiled, preferably helical metallic spring elements to give the material a resiliency desirable in order that it may retain unimparied its loosely aggregated condition and, when used as a lubricant carrier, its capacity for absorbing the lubricant.

The object of the invention is to provide an improvement in a composite material of this type, consisting in providing the ends of the helical springs with acute angle return bends, the bent portions lying, preferably, in substantially the same planes with the adjacent portions of the springs, to eliminate the possibility of the material cutting the hands of persons handling it, to facilitate the weaving or insertion of the springs into the waste or like material, and to insure the retention of the springs therein; the bends being of such character as to give the ends of the springs a barbed or "fish hook" configuration which makes it easy to insert the springs (the formation of burs on the severed ends of the wires having sometimes interfered with this operation in the manufacture of the material with the springs as shown in my patent above referred to) besides effectively checking any tendency which there may be for the springs to work out of the waste.

The method of, and apparatus for, making the material as hereinafter described, is claimed in my copending application, Serial No. 21,165, filed April 6, 1925, which application is a division of this present application.

The invention is illustrated in the accompanying drawings in which

Fig. 1 is a perspective view of the improved form of spring.

Fig. 2 is a fragmentary, longitudinal sectional view of the apparatus for forming the springs and inserting them into the waste.

Fig. 3 is a fragmentary side elevation, with parts in section, to illustrate the construction of the improved die block and movable die for effecting the bending and cutting operations.

Fig. 4 is a bottom view of the parts shown in Fig. 3.

Fig. 5 is a sectional view on line 5—5 of Fig. 4.

Figs 6 and 7 are views, in perspective, of the movable die member.

Fig. 8 is a similar view of a spring retaining device for the severed end of the wire which is associated with the movable die member.

Fig. 9 is an inverted sectional plan view on line 9—9 of Fig. 3, and

Figs. 10 and 11 are views similar to Fig. 9 but showing the parts in different positions.

Referring to the drawings, 12 designates one of the helical wire spring elements, the extremities 13 and 14 of which are bent at acute angles to the adjacent portions of the wire, the bent over portions 13, 14 being not only bent backwardly but also the portion 13 downwardly and the portion 14 upwardly so that the parts of the "fish hook" ends or barbs on the spring are, in each case, in the same plane or approximately so.

The operations of forming the springs from a continuous wire, cutting the wire into lengths and inserting the formed severed lengths into the cotton waste or other loosely aggregated material (designated 15 in Figs. 2 and 5) are, in general, the same as those described in my prior Patent 1,395,299, except that for my present purposes the machine as described in that patent had to be altered in certain important respects in order to effect the desired bending over of the ends of the springs when formed.

Referring to Fig. 2, the waste or other material 15 into which the spring elements are inserted is supported on a conveyor 16 which is moved by any suitable mechanism from right to left under the wire forming die block 17 into which is fed, by means of feed rollers 18, a continuous wire 19. 20 designates a movable die member which is reciprocated, by any suitable mechanism (not shown), across the lower end of die block 17 to sever the wire which has been bent to helical configuration in block 17 and to form the ends of the severed wire with acute angle return bends. The body of material 15 as it approaches die block 17 is raised by means of an eccentric roller 21 operating against the under side of conveyor 16. As the material is lifted toward the die block, and against a guide plate 22 arranged thereunder, the helically formed wire is screwed into the material through an opening 23 in guide plate 22 (Fig. 5), the bending of the wire into its helical form and its insertion in the waste being one continuous operation. The lower end of the wire will have already been given its barbed or "fish hook" construction 14. When the wire has been inserted to a proper length in the waste the movable die 20 is thrust forward (to the right, Fig. 3), severing the portion of the wire inserted in the waste and at the same time forming the bends on the upper end of this piece of wire and the lower end of the wire in the die block. The upper end of the inserted wire spring will stand a little above the body of waste but when the waste is taken from the machine and baled the interweaving of the springs in the material will be complete. In the baling operation the material is handled so that the springs stand in every direction in the waste.

Referring now to Figs. 3 to 11 inclusive, the die block, as shown, consists of an outer shell 24 and a core or mandrel 25, these parts being held together by a pin 26 (Fig. 5). The die block is formed between the shell and core with a helical groove or passage 27 through which the wire is forced to give it the coiled configuration. The bottom of the die block is formed with a cutting blade 28 of substantial thickness since it is desirable not merely to sever the wire but to cut a piece out of it at the place of severance. The coiled wire 12 passes from the lower end opening 29 of the forming groove 27 across in front of the cutting blade 28 to a groove 30 in the outer face of the curved lug or anvil 31 projecting from the bottom of the core 25 of the die block (Fig. 9). From this point it passes down through opening 23 in guide plate 22 into the body of waste 15. The movable die 20 is formed with cutting edges 32, 32 on opposite sides of a slot 33 which bifurcates the die so that it will straddle blade 28. The forward end of the die is formed with a wedge-shaped nose 34 which engages the wire 12 and adjusts it in its cutting position. On one side of the die is a tapered groove 35 extending upwardly and backwardly to engage the lower end of the portion of the wire remaining in the die block and bend the same inwardly and upwardly over an anvil 36, which is in the form of a lug projecting downwardly from the bottom of core 25 within a projecting portion 37 on the bottom of the shell, to form the acute angle return bend or barb 14 on the lower end of the coil. The other side of the die 20 is formed with a backwardly and downwardly tapered groove 38 to engage the upper end of the severed coil and bend the same backwardly over anvil 31 and downwardly to form the upper barb 13. Fig. 10 shows the relation of the parts as the cut is about to be made and Fig. 11 their relative positions when, with a further forward movement of die member 20, the bends 13 and 14 on the ends of the wires are made.

In order to hold the upper end of the severed coil in engagement with anvil 31 an angular holding device 39 is secured to the movable die, this device being provided with a forwardly extending spring arm 40 which bears against the wire 12. The movable die member 20 now retreats and as the material is carried forwardly and downwardly by movement of the conveyor the upper end of the embedded spring slips from the anvil 31.

It is fully appreciated that the operations above described by which the springs are formed and embedded in or interwoven with the waste might be performed by apparatus differing from that above described. This is, however, the preferred method and apparatus for manufacturing this material, and is claimed in my divisional application, Serial No. 21,165, hereinabove referred to.

I claim:

1. Journal box packing material comprising a mass of fibrous material capable of absorbing oil and a plurality of coiled springs embedded therein, both extremities of each spring being bent back.

2. Journal box packing comprising a body of loosely aggregated material capable of absorbing oil and coiled springs interwoven therewith, the ends of which are bent back at acute angles.

3. Journal box packing comprising a body of loosely aggregated material capable of absorbing oil and coiled springs interwoven therewith, the ends of which are formed with acute angle bends of "fish hook" configuration.

4. Journal box packing comprising a body of loosely aggregated material capable of absorbing oil and coiled springs interwoven therewith, the ends of which are bent at an acute angle with and into substantially the planes of the portions adjacent said bent portions.

CHARLES T. RIPLEY.